United States Patent
Zeng

(10) Patent No.: US 10,031,568 B2
(45) Date of Patent: Jul. 24, 2018

(54) TABLET COMPUTER WITH A STEP-UP CIRCUIT

(71) Applicants: BOE TECHNOLOGY GROUP CO., LTD., Beijing (CN); K-TRONICS (SUZHOU) TECHNOLOGY CO., LTD., Suzhou, Jiangsu (CN)

(72) Inventor: Chao Zeng, Beijing (CN)

(73) Assignees: BOE TECHNOLOGY GROUP CO., LTD., Beijing (CN); K-TRONICS (SUZHOU) TECHNOLOGY CO., LTD., Suzhou, Jiangsu (CN)

( * ) Notice: Subject to any disclaimer, the term of this patent is extended or adjusted under 35 U.S.C. 154(b) by 167 days.

(21) Appl. No.: 15/038,295

(22) PCT Filed: Sep. 25, 2015

(86) PCT No.: PCT/CN2015/090751
§ 371 (c)(1),
(2) Date: May 20, 2016

(87) PCT Pub. No.: WO2016/173202
PCT Pub. Date: Nov. 3, 2016

(65) Prior Publication Data
US 2017/0102751 A1    Apr. 13, 2017

(30) Foreign Application Priority Data
Apr. 28, 2015   (CN) .......................... 2015 1 0208901

(51) Int. Cl.
| | |
|---|---|
| *G06F 1/00* | (2006.01) |
| *G06F 1/26* | (2006.01) |
| *G06F 1/16* | (2006.01) |
| *G05F 3/08* | (2006.01) |
| *H02H 7/18* | (2006.01) |
| *H02J 7/00* | (2006.01) |

(52) U.S. Cl.
CPC ................ *G06F 1/266* (2013.01); *G05F 3/08* (2013.01); *G06F 1/1613* (2013.01); *H02H 7/18* (2013.01);
(Continued)

(58) Field of Classification Search
CPC ........ H02J 7/0052; H02J 7/0054; H02J 7/007; H02J 2007/0062; H02J 7/0065;
(Continued)

(56) References Cited

U.S. PATENT DOCUMENTS

2014/0217959 A1   8/2014  Chen et al.
2014/0304542 A1*  10/2014 Rogers ...................... G06F 1/28
                                                                  713/340
(Continued)

FOREIGN PATENT DOCUMENTS

| CN | 1395133 A | 2/2003 |
|---|---|---|
| CN | 101685974 A | 3/2010 |

(Continued)

OTHER PUBLICATIONS

Song Yao, English Translation of CN103515662 A.*
(Continued)

*Primary Examiner* — Xuxing Chen
(74) *Attorney, Agent, or Firm* — Nath, Goldberg & Meyer; Joshua B. Goldberg

(57) ABSTRACT

The present disclosure provides a tablet computer. The tablet computer includes a battery and a voltage regulator circuit, wherein the voltage regulator circuit includes a step-up circuit for raising a voltage supplied by the battery in order to utilizing the raised voltage to charge an external device connected with the tablet computer.

18 Claims, 5 Drawing Sheets

(52) U.S. Cl.
CPC .......... *H02J 7/0054* (2013.01); *H02J 7/0065* (2013.01); *H02J 2007/0059* (2013.01); *H02J 2007/0062* (2013.01)

(58) Field of Classification Search
CPC .. H02J 7/0044; H02J 7/16; G06F 1/26; G06F 1/1613
See application file for complete search history.

(56) References Cited

U.S. PATENT DOCUMENTS

| | | | | |
|---|---|---|---|---|
| 2015/0056476 | A1* | 2/2015 | Roohparvar | H02J 7/0063 429/7 |
| 2015/0188355 | A1* | 7/2015 | Chuang | H02J 7/025 320/108 |
| 2015/0236538 | A1* | 8/2015 | Cai | H01M 10/00 320/112 |

FOREIGN PATENT DOCUMENTS

| | | |
|---|---|---|
| CN | 201429756 Y | 3/2010 |
| CN | 201868905 U | 6/2011 |
| CN | 201993719 U | 9/2011 |
| CN | 202068208 U | 12/2011 |
| CN | 202405818 U | 8/2012 |
| CN | 103383508 A | 11/2013 |
| CN | 103515662 A | 1/2014 |
| CN | 103746411 A | 4/2014 |
| CN | 204103542 U | 1/2015 |
| CN | 104767252 A | 7/2015 |
| CN | 204615444 U | 9/2015 |

OTHER PUBLICATIONS

Song Yao, English Translation of CN 103515662 A, Jan. 15, 2014 (Year: 2014).*
The Second Office Action dated Sep. 8, 2017 corresponding to Chinese application No. 201510208901.4.
Office Action dated Aug. 2, 2016 issued in corresponding Chinese Application No. 201510208901.4.
Office Action dated Jul. 27, 2016 issued in corresponding Chinese Application No. 201410235918.4.
International Search report dated Feb. 2, 2016 issued in corresponding International Application No. PCT/CN2015/090751 along with an English translation of the Written Opinion of the International Searching Authority.

* cited by examiner

TABLET COMPUTER WITH A STEP-UP CIRCUIT

This is a National Phase Application filed under 35 U.S.C. 371 as a national stage of PCT/CN2015/090751, filed Sep. 25, 2015, an application claiming the benefit of Chinese Application No. 201510208901.4, filed Apr. 28, 2015, the content of each of which is hereby incorporated by reference in its entirety.

FIELD OF THE INVENTION

The present disclosure relates to the field of intelligent terminal, and particularly, to a tablet computer.

BACKGROUND OF THE INVENTION

At present, a battery of a tablet computer is mainly used for supplying power to a display panel, an internal processor and circuit. The voltage of the battery is relatively small, and a corresponding current is generally not larger than 500 mA.

Usually, an external device connected with the tablet computer, for example, by an On The Go data line (OTG line), also requires power being supplied from the tablet computer. However, when an external device with a charging current of more than 500 mA requires power being supplied from the tablet computer, the current that is less than 500 mA usually cannot supply power to the internal processor and circuit and charge the external device simultaneously.

SUMMARY OF THE INVENTION

The present disclosure aims at solving at least one of the technical problems existing in the prior art, and provides a tablet computer, which is capable of charging an external device connected therewith.

To achieve the aim of the present disclosure, there is provided a tablet computer, which includes a battery and a voltage regulator circuit; the voltage regulator circuit includes a step-up circuit for raising a voltage supplied by the battery in order to utilizing the raised voltage to charge an external device connected with the tablet computer.

In some embodiments, the tablet computer has a first charging port, one end of the first charging port being connected with the step-up circuit and the other end thereof being connected with the external device to be charged. Further preferably, the first charging port is an USB port or a DC port.

In some embodiments, the tablet computer has a wireless transmission module, the wireless transmission module transmitting signals and being used for wirelessly connecting the tablet computer with a to-be-charged external device having a wireless receiving module.

In some embodiments, the step-up circuit is a Boost circuit.

In some embodiments, the Boost circuit includes an inductor, a diode and a triode, the inductor and the diode being connected in series between a positive electrode of the battery and a positive electrode of an output of the Boost circuit, and the triode being used as a switch, an input thereof being connected between the inductor and an input of the diode and an output thereof being connected between a negative electrode of the battery and a negative electrode of the output of the Boost circuit.

In some embodiments, the voltage regulator circuit further includes a step-down circuit for lowering a voltage to be input into the battery in order to make the voltage input into the battery be in a range of charging voltage for the battery.

In some embodiments, the tablet computer has a second charging port, one end of the second charging port being connected with the step-down circuit and the other end thereof being used for connecting with a charger. Further preferably, the second charging port is an USB port or a DC port.

In some embodiments, the step-down circuit is a Buck circuit or a DC-DC step-down circuit.

In some embodiments, the DC-DC step-down circuit includes: a power supply input for inputting a power supply voltage; a power supply output for outputting a load voltage; a step-down control module for converting the power supply voltage input through the power supply input into the load voltage and for outputting the load voltage through the power supply output, an input of the step-down control module being connected with the power supply input and an output thereof being connected with the power supply output, and the step-down control module including a step-down control chip; and an external linear voltage regulator module for converting the load voltage into a chip operating voltage so as to supply power to the step-down control chip, an input of the external linear voltage regulator module being connected with the power supply output and an output thereof being connected with a bias power supply end of the step-down control module.

In some embodiments, the DC-DC step-down circuit further includes: an input filter module which is connected between the power supply input and the input of the step-down control module and is used for filtering the power supply voltage that is input from the power supply input; an output feedback module, an input thereof being connected with the output of the step-down control module and an output thereof being connected with a feedback end of the step-down control module, wherein the output feedback module is used for sampling the load voltage output from the step-down control module and feeding back the same to the step-down control module; and a output filter module which is connected between the output of the step-down control module and the power supply output and is used for filtering the load voltage that is output from the step-down control module.

In some embodiments, the Buck circuit includes a master control circuit, a controller and a MOS driver module.

In some embodiments, the tablet computer has a dual purpose port which is connected with the step-down circuit and the step-up circuit, the dual purpose port being used for connecting with an external device to be charged or being used for connecting with a charger.

In some embodiments, the voltage regulator circuit further includes a protection circuit.

In some embodiments, capacity of the battery is not less than 5000 mAh.

In some embodiments, the voltage regulator circuit is coupled with an operation system of the tablet computer, so as to monitor the capacity and the status of charging and discharging of the battery.

The present disclosure has the following benefits:

The tablet computer provided by the present disclosure includes the voltage regulator circuit, and the step-up circuit included in the voltage regulator circuit is capable of raising the voltage supplied by the battery of the tablet computer, so that the raised voltage can be used for charging an external device connected with the tablet computer. In this manner, in a case where an external device with a relative small battery capacity, such as a mobile phone, runs out the battery, the external device can be charged through the carried on tablet computer that has a relative large battery capacity, so as to avoid a trouble in which a dedicated portable power supply has to be carried with a user.

BRIEF DESCRIPTION OF THE DRAWINGS

Accompanying drawings are used for providing further understandings of the present disclosure, constitute as a part of the specification, and are used to explain the present disclosure in conjunction with the following specific implementations, but not to restrict the present disclosure. In the drawings.

DETAILED DESCRIPTION OF THE EMBODIMENTS

The specific implementations of the present disclosure will be explained in details below in conjunction with the accompanying drawings. It should be understood that the specific implementations described herein are merely used to explain and illustrate the present disclosure, but not to restrict the present disclosure.

Figure 1:
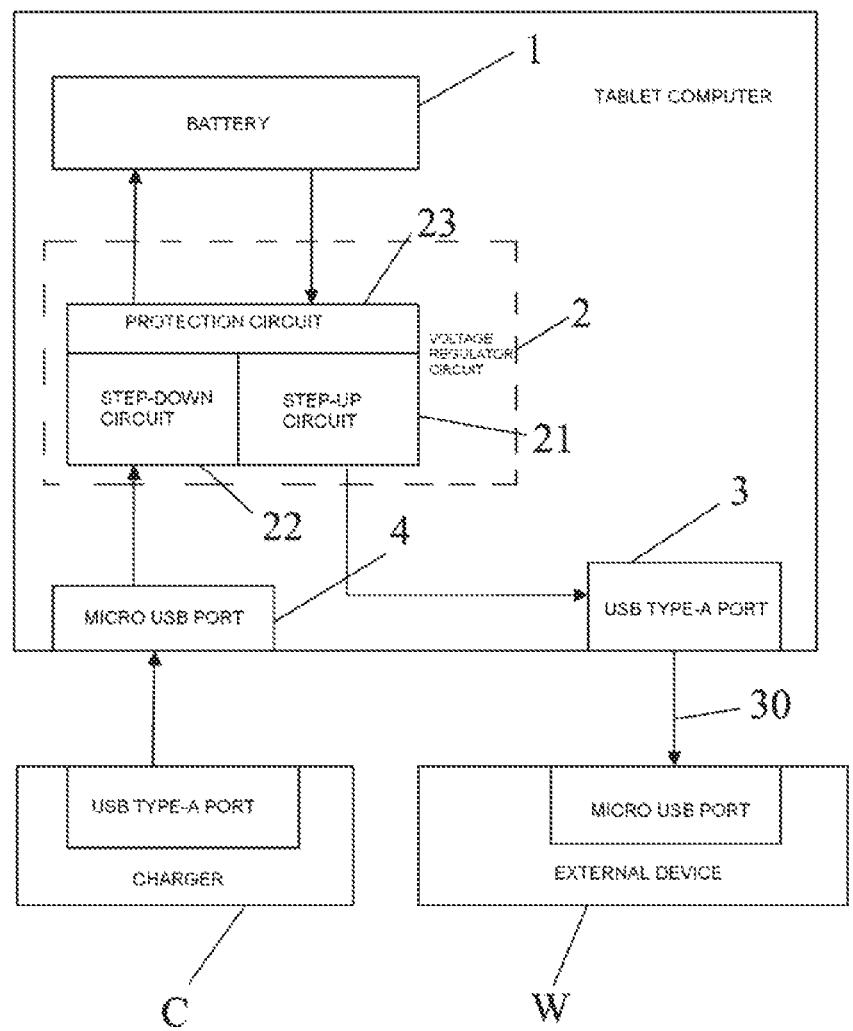
FIG. 1 is a schematic diagram of a tablet computer provided by a first implementation of the present disclosure.

In one of the implementations of the present disclosure, as shown in FIG. 1, a tablet computer includes: a battery 1 and a voltage regulator circuit 2; the voltage regulator circuit 2 includes a step-up circuit 21 for raising a voltage supplied by the battery 1 in order to utilizing the raised voltage to charge an external device VV connected with the tablet computer.

Specifically, the step-up circuit 21 raises the voltage supplied by the battery 1, such that the raised voltage is not lower than a charging voltage for a battery of the external device VV. In this case, when the tablet computer is connected with the external device VV, the battery 1 of the tablet computer is capable of charging a battery in the external device W. In such a way, when a user has carried the tablet computer and other external devices such as a mobile phone, in a case where the battery of the external device such as a mobile phone is low in power or runs out, it is possible to connect the external device such as a mobile phone with the tablet computer, raise the voltage supplied by the battery 1 of the tablet computer through the step-up circuit 21 of the tablet computer, and charge the battery of the external device such as a mobile phone by the raised voltage. As such, it is possible to avoid the external device such as a mobile phone not working due to low power, and to avoid a trouble in which a portable power supply has to be carried with the user.

In one implementation of the present disclosure, referring to FIG. 1, the voltage regulator circuit 2 may further include a step-down circuit 22 and/or a protection circuit 23. In actual applications, when the battery 1 of the tablet computer has to be charged through an external power supply, the step-down circuit 22 is used for lowering a charging voltage from the external power supply, which is input into the battery 1 of the tablet computer, so that the voltage input into the battery 1 is in a range of charging voltage for the battery 1, and thus the battery 1 of the tablet computer can be charged through the lowered voltage. When the external device W is being charged by the battery 1 of the tablet computer and when the battery 1 of the tablet computer is being charged by the external power supply, the protection circuit 23 is used for preventing one or more of the following abnormal situations from occurring: the battery 1 of the tablet computer is over discharged; the battery of the tablet computer is over charged; an over-current is occurred when the battery 1 of the tablet computer is being charged by the external power supply or when the external device W is being charged by the battery 1 of the tablet computer; the voltage supplied by the battery 1 is over raised by the step-up circuit 21; circuit short; and the temperature of the battery of the tablet computer gets too high.

In the implementation, the tablet computer has a first charging port, one end of the first charging port is connected with the step-up circuit 21 and the other end thereof is connected with the external device W to be charged. In some implementations, the first charging port is an USB (Universal Serial Bus) port and is connected with the external device W to be charged through an USB cable. Specifically, as shown in FIG. 1, the first charging port may be a USB type-A port 3. In practice, the external device is provided with a port matching with the first charging port, and the port is connected with the first charging port through a cable. As shown in FIG. 1, the USB type-A port 3 is connected with a Micro USB port of the external device W through a USB cable 30, so as to achieve charging of the external device W.

In addition, the tablet computer may further have a second charging port, one end of the second charging port is connected with the step-down circuit 22 and the other end thereof is connected with a charger C. In some implementations, the second charging port is an USB port 4. Specifically, the second charging port 4 may be a Micro USB port, that is, one end of the USB cable corresponding to the USB type-A port is connected with the charger C for the tablet computer, while one end of the USB cable corresponding to the Micro USB port is connected with the tablet computer. Further, the USB cable may be the USB cable 30, that is, a single USB cable can be used as the one connecting the tablet computer and the external device W and the one connecting the tablet computer and the charger C therefor.

Optionally, the rated input and output voltages of the USB ports 3 and 4 are 5V. As for an existing portable device having an USB port, such as a tablet computer, a mobile phone or the like, the charging voltage for the battery therein is typically around 5V, the above settings can be compatible with most of portable devices and their external devices having an USB port. In this case, taking an example that the rated voltage of the battery 1 of the tablet computer is 3.7 V, which is normal, the charging procedure on the tablet computer is: inputting a 5 V voltage into the tablet computer through the charger C, lowering the voltage from 5 V to 4.2V through the step-down circuit 22, wherein the lowered voltage is slightly higher than the rated voltage 3.7 V of the battery 1 and can be used for charging the battery 1; and the charging procedure on the external device from the tablet computer is: raising the rated voltage 3.7 V of the battery 1 to 5V through the step-up circuit 21, inputting the raised voltage to the external device W via the USB port 3 and the USB cable 30 so as to charging the battery of the external device W.

It should be noted that, the USB port 3 is not limited to USB type-A port, and the USB port 4 is not limited to Micro USB port, both of them can be any other port complying with USB standards or any standard port matching with commercial portable devices. Certainly, the number of the USB ports of the tablet computer is not limited to two, and it may be one, that is, the tablet computer can connect with the charger C or connect with the external device VV through one USB port, and the USB port is a dual purpose port.

In the implementation, capacity of the battery of the tablet computer is not less than 5000 mAh, so that the battery 1 of the tablet computer has sufficient power to charge various external devices.

Figure 2:
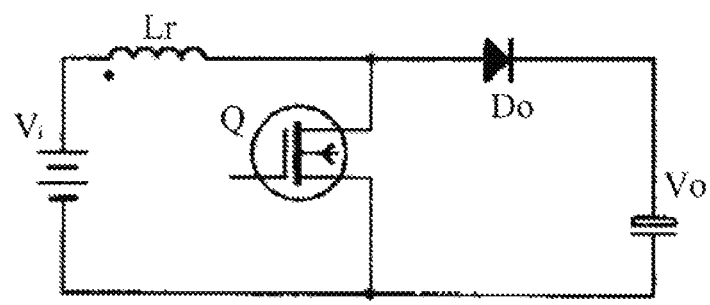
FIG. 2 is a schematic diagram of a Boost circuit of the tablet computer shown in FIG. 1.

Specifically, the step-up circuit 21 may be a Boost circuit for raising the voltage supplied by the battery 1 to an output voltage (5 V in this implementation) that is capable of charging the external device W connected through the USB port 3, and charging the external device W through the USB port 3. Specifically, the Boost circuit may be of the circuit structure as shown in FIG. 2, which includes an inductor Lr and a diode Do that are connected in series between a positive electrode of a power supply Vi and a positive electrode of an output Vo of the circuit, and a triode Q as a switch with one end thereof connected between the inductor Lr and the diode Do; wherein an input of the triode Q is connected between the inductor Lr and an input of the diode Do and an output of the triode Q is connected between a negative electrode of the power supply Vi and a negative of the output Vo of the circuit. In the circuit structure as shown in FIG. 2, the power supply Vi supplies power, the inductor Lr stores energy when the triode Q is turned on, and the inductor releases energy to the output Vo of the circuit through the diode Do when the triode Q is turned off, so that a reliable step-up output can be realized by controlling the on-off of the triode Q.

Figure 3:
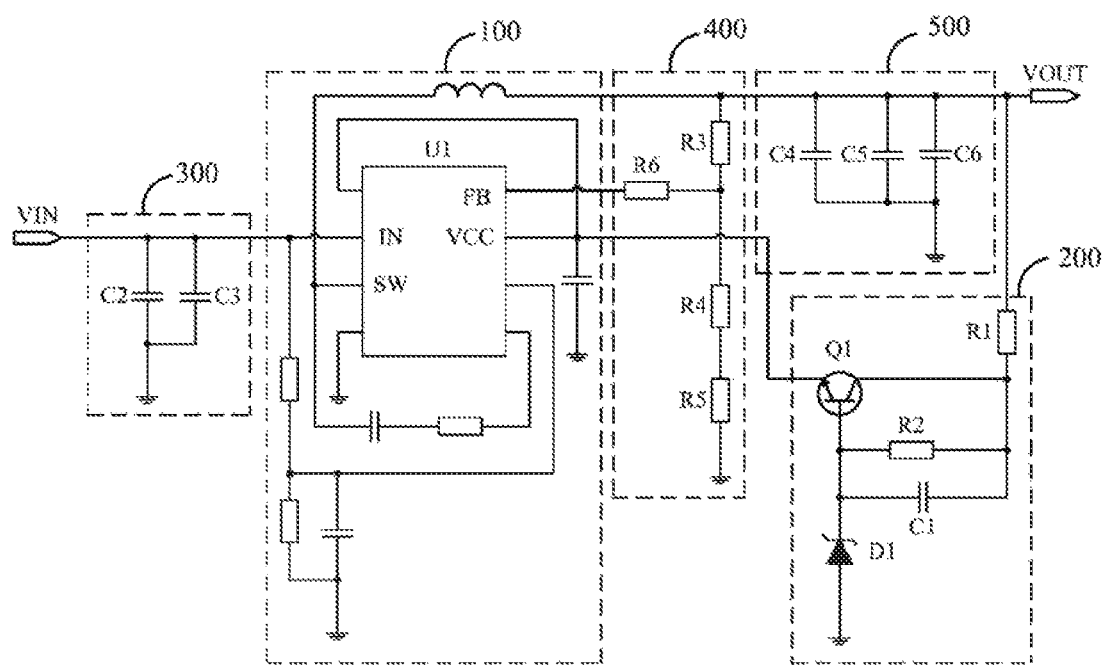
FIG. 3 is a schematic diagram of a DC-DC step-down circuit of the tablet computer shown in FIG. 1.

Specifically, the step-down circuit 22 may be a DC-DC step-down circuit for lowering the voltage (5 V in the implementation) input from an external power supply to a charging voltage (4.2 V in the implementation) for the battery 1, so as to charge the battery 1. Specifically, the DC-DC step-down circuit may be of the structure as shown in FIG. 3, which includes a power supply input VIN, a power supply output VOUT, a step-down control module 100 and an external linear voltage regulator module 200. Wherein, an input of the step-down control module 100 is connected with the power supply input VIN, and an output of the step-down control module 100 is connected with the power supply output VOUT; an input of the external linear voltage regulator module 200 is connected with a bias power supply end of the step-down control module 100. The power supply input VIN is used for inputting a power supply voltage, and the power supply output VOUT is used for outputting a load voltage. The step-down control module 100 includes a step-down control chip U1, the step-down control module 100 converts the power supply voltage input through the power supply input VIN into the load voltage, and outputs the load voltage through the power supply output VOUT, so as to supply an operating voltage to a load needed to be powered by the load voltage. Meanwhile, after the step-down control module 100 outputs the load voltage, the external linear voltage regulator module 200 converts the load voltage into a chip operating voltage so as to power the step-down control chip U1, therefore, when the DC-DC step-down circuit is just powered up and the load voltage has not been output, the step-down control chip U1 converts the input power supply voltage and outputs a chip operating voltage to power the step-down control chip U1 through an internal low dropout regulator (LDO); and when the load voltage has been output, the step-down control chip U1 is powered by the chip operating voltage that is converted from the load voltage, instead of the chip operating voltage that is output from the internal LDO of the step-down control chip U1.

As shown in FIG. 3, preferably, the DC-DC step-down circuit further includes an input filter module 300, an output feedback module 400 and an output filter module 500. Wherein, an input of the output feedback module 400 is connected with an output of the step-down control module 100, an output of the output feedback module 400 is connected with a feedback end of the step-down control module 100, and the output feedback module 400 is used for sampling the load voltage output from the step-down control module 100 and feeding back the same to the step-down control module 100, so that the step-down control module 100 adaptively adjusts the output of the load voltage according to the feedback, so as to ensure the load voltage can be stably output. The input filter module 300 is connected between the power supply input VIN and the input of the step-down control module 100, and is used for filtering the power supply voltage that is input from the power supply input VIN, so as to filter out ripple signals in the power supply voltage. The output filter module 500 is connected between the output of the step-down control module 100 and the power supply output VOUT, and is used for filtering the load voltage that is output from the step-down control module 100, filtering out ripple signals in the load voltage, so that the power supply output VOUT can stably output the load voltage. The exemplary circuit structures of the step-down control module 100, the external linear voltage regulator module 200, the input filter module 300, the output feedback module 400 and the output filter module 500 are as shown in FIG. 3.

Specifically, the external linear voltage regulator module 200 includes a triode Q1, a voltage-regulator diode D1, a first resistor R1, and a second resistor R2, the triode Q1 being of a NPN triode; wherein, one end of the first resistor R1 is connected with the power supply output VOUT, and the other end of the first resistor R1 is connected with the collector of the triode Q1 and one end of the second resistor R2; the other end of the second resistor R2 is connected with the base of the triode Q1 and the cathode of the voltage-regulator diode D1; the anode of the voltage-regulator diode D1 is grounded; the emitter of the triode Q1 is connected with a bias power supply pin VCC of the step-down control chip U1 in the step-down control module 100; the external linear voltage regulator module 200 also includes a first capacitor C1, one end of which is connected with the common end of the first and second resistors R1 and R2, and the other end thereof is connected with the cathode of the voltage-regulator diode D1.

The output feedback module 400 includes a third resistor R3 and a fourth resistor R4; one end of the third resistor R3 is connected with a power switching output pin SW of the step-down control chip U1 in the step-down control module 100, and the other end thereof is connected with a feedback input pin FB of the step-down control chip U1 and is grounded via the fourth resistor R4; as voltage sampling resistors, the third and fourth resistors R3 and R4 sample the output load voltage and divide the output load voltage, so as to feedback to the step-down control chip U1 in the step-down control module 100. In the present implementation, according to actual needs, the resistances of the third and fourth resistors R3 and R4 can be appropriately selected, or the number of the voltage sampling resistors can be increased appropriately, so as to divide the load voltage. For example, the output feedback module 400 further includes a fifth resistor R5, wherein the fourth resistor R4 is grounded via the fifth resistor R5; as the voltage sampling resistor, the fifth resistor R5 is connected in series with the third resistor R3 and the fourth resistor R4 for dividing the load voltage; the output feedback module 400 further includes a sixth resistor R6, one end of the sixth resistor R6 being connected with the common end of the third and fourth resistors R3 and R4 and the other end of the sixth resistor R6 being connected with the feedback input pin FB of the step-down control chip U1. As a current-limiting resistor for the feedback input pin FB of the step-down control chip U1, the sixth resistor R6 plays a role of protecting the step-down control chip U1.

The input filter module 300 includes a second capacitor C2 and a third capacitor C3. Wherein, one end of the second capacitor C2 is connected with the power supply input VIN and also connected with a power supply input pin IN of the step-down control chip U1 in the step-down control module 100, and the other end of the second capacitor C2 is grounded. The third capacitor C3 is connected with the second capacitor in parallel. The second and third capacitors C2 and C3 act as decoupling filtering capacitors for power supply voltages input from the power supply input VIN.

The output filter module 500 includes a fourth capacitor C4, a fifth capacitor C5 and a sixth capacitor C6. Wherein, one end of the fourth capacitor C4 is connected with the power switching output pin SW of the step-down control chip U1 in the step-down control module 100 and also connected with the power supply output VOUT, and the other end of the fourth capacitor C4 is grounded. The fifth and sixth capacitors C5 and C6 are connected with the fourth capacitor C4 in parallel. The fourth, fifth and sixth capacitors C4, C5 and C6 act as decoupling filtering capacitors for load voltages output from the power supply output VOUT.

In the implementation, the voltage regulator circuit 2 is coupled with an operation system of the tablet computer, so as to monitor the capacity and the status of charging and discharging of the battery 1. As such, the capacity of the battery 1 of the tablet computer can be clearly seen from the operation system or software applications of the tablet computer, and the charging procedure and status of the tablet computer to the external device W can be monitored.

Figure 4:
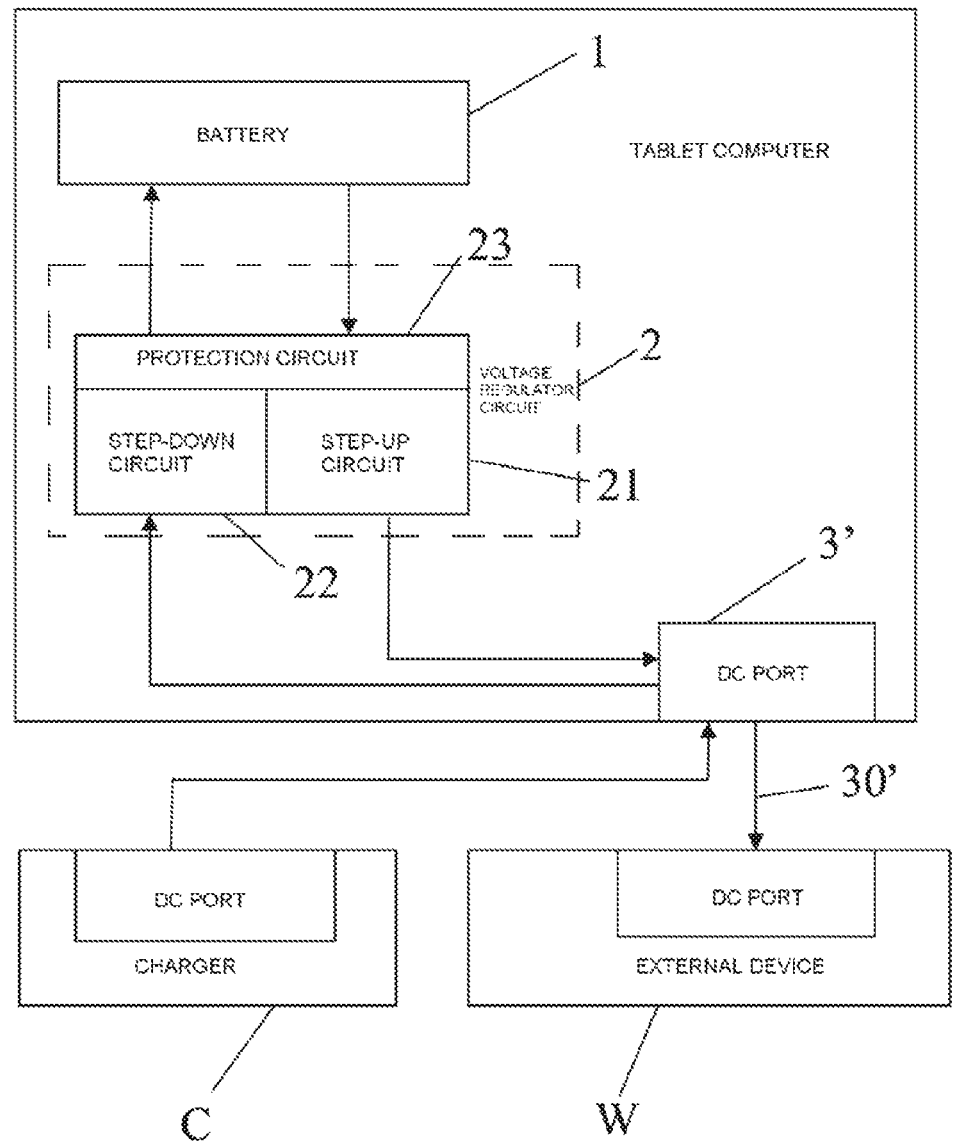
FIG. 4 is a schematic diagram of a tablet computer provided by a second implementation of the present disclosure.

FIG. 4 is a schematic diagram of a tablet computer provided by a second implementation of the present disclosure, As shown in FIG. 4, the difference between the tablet computer of this implementation and that of the above implementation lies in that the first charging port of the tablet computer is a DC port 3', and the DC port is connected with the external device W to be charged through a DC cable 30', that is, the DC port 3' is used instead of the USB port 3 in the first implementation.

The DC port can be used as an output in a discharging process and an input in a charging process, that is, the DC port can be used as a dual purpose port. In the present implementation, the DC port 3' is also used for connecting with a charger C, so that the tablet computer can be provided with one port only, thereby reducing the number of ports.

In addition, the DC port can allow a wider input and output voltage range. Therefore, in this implementation, when the step-up circuit 21 is a Boost circuit, the voltage of the battery 1 can be boosted to different voltages such as 5 V, 9 V, 12 V or the like, based on the type of the external device W to be charged, so as to charge the external device W.

Figure 5:
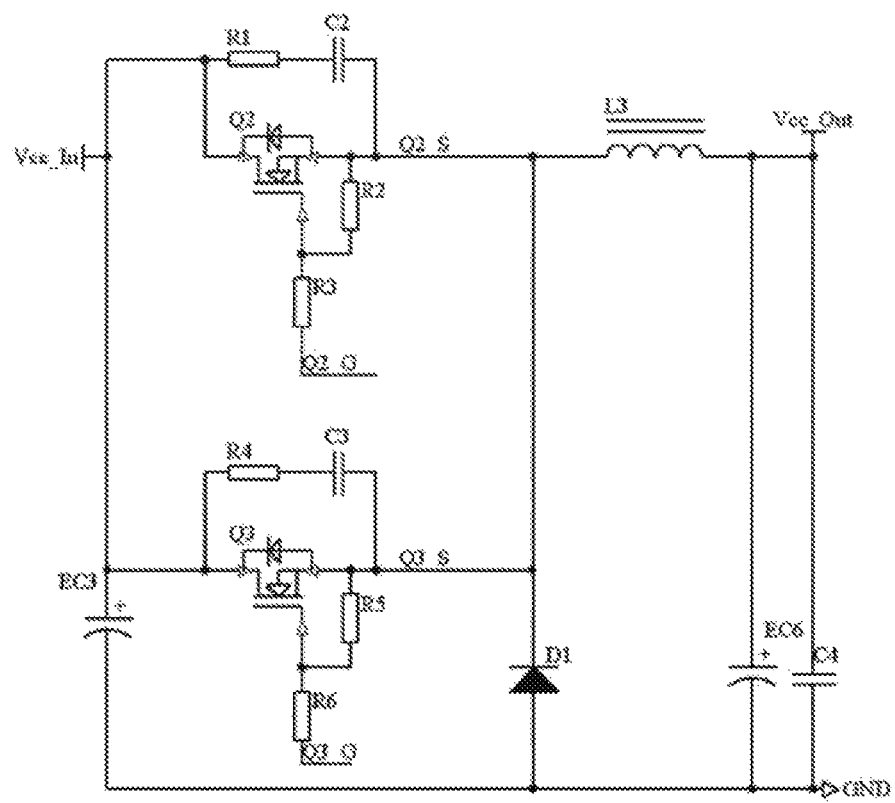
FIG. 5 is a schematic diagram of a master control circuit in a Buck circuit.
Figure 6:
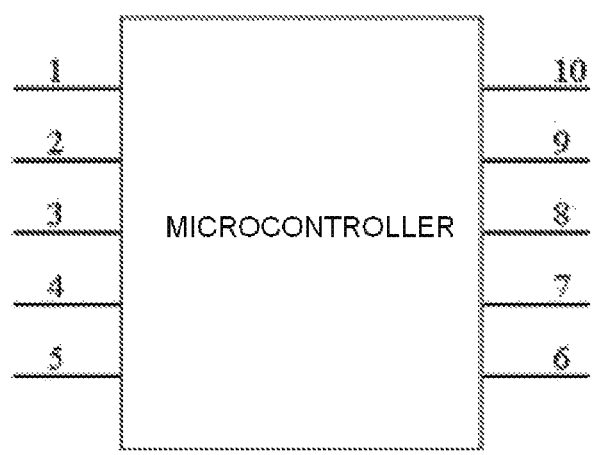
FIG. 6 is a schematic diagram of a microcontroller in the Buck circuit.
Figure 7:
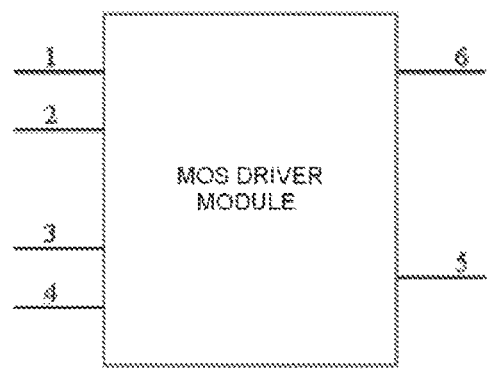
FIG. 7 is a schematic diagram of a MOS driver module in the Buck circuit.

Meanwhile, the step-down circuit 22 may be a Buck circuit. The Buck circuit can be compatible with chargers having different output voltages, such as chargers having output voltages of 5 V, 9V, 12V or the like, so as to charge the battery 1 of the tablet computer. Specifically, the Buck circuit may include a master control circuit, a microcontroller and a MOS driver module, as shown in FIGS. 5-7. As shown in FIG. 5, the master control circuit includes an inductor L3, a diode D1, Mos transistors Q2-Q3, resistors R1-R6, capacitors C2-C4 and electrolytic capacitors EC3, EC6; wherein, an cathode of the diode D1 is connected with one end of the inductor L3, one end of the capacitor C2, one end of the capacitor C3, one end of the resistor R2, one end of the resistor R5, a source of the Mos transistor Q2, a source of the Mos transistor Q3 and the MOS driver module, and the cathode of the diode D1 is connected with pin 2 and pin 4 of the MOS driver module; the other end of the capacitor 02 is connected with one end of the resistor R1, and the other end of the resistor R2 is connected with a gate of the Mos transistor Q2 and one end of the resistor R3; the other end of the capacitor C3 is connected with one end of the resistor R4, and the other end of the resistor R5 is connected with a gate of the Mos transistor Q3 and one end of the resistor R6; the other end of the resistor R3 is connected with pin 1 of the MOS driver module, and the other end of the resistor R6 is connected with pin 3 of the MOS driver module; an positive electrode of the electrolytic capacitor EC3 is connected with the other end of the resistor R1, the other end of the resistor R4, a drain of the Mos transistor Q2 and a drain of the Mos transistor Q3; an positive electrode of the electrolytic capacitor EC6 is connected with one end of the capacitor C4 and the other end of the inductor L3, and functions as an output of the master control circuit; an negative electrode of the electrolytic capacitor EC3, an anode of the diode D1, an negative electrode of the electrolytic capacitor EC6 and the other end of the capacitor C4 are grounded. As shown in FIGS. 6 and 7, the microcontroller is connected with the MOS driver module, wherein pin 3 of the microcontroller is connected with pin 6 of the MOS driver module and pin 5 of the microcontroller is connected with pin 5 of the MOS driver module. Wherein, the Mos transistors Q2 and Q3 are N-type Mos transistors. The microcontroller is of a type being capable of generating two PWM (Pulse Width Modulation) waves, which are 180° out of phase.

Figure 8:
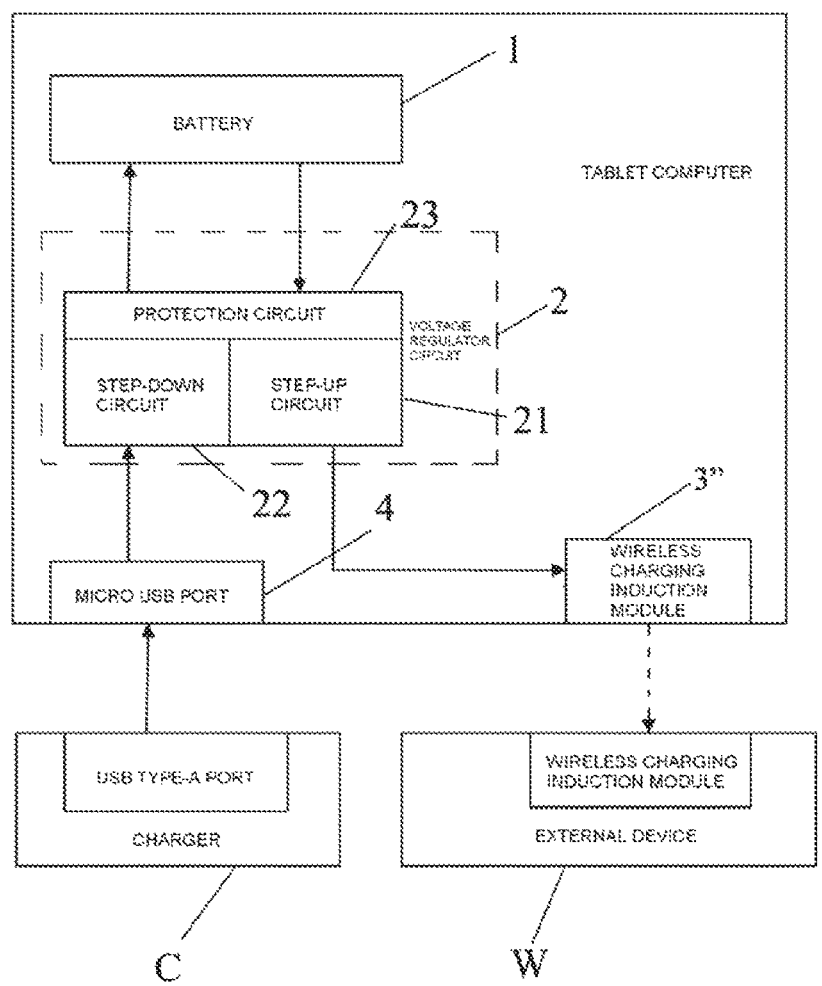
FIG. 8 is a schematic diagram of a tablet computer provided by a third implementation of the present disclosure.

FIG. 8 is a schematic diagram of a tablet computer provided by a third implementation of the present disclosure. As shown in FIG. 8, the difference between the tablet computer of the present implementation and those of the first and second implementations lies in that the tablet computer has a wireless charging induction module 3", which delivers energy to a to-be-charged external device W having a wireless charging induction module by utilizing near-field induction. That is, the wireless induction charging with the external device W is realized by replacing the USB port 3 in the first implementation and the DC port 3' in the second implementation with the wireless charging induction module 3".

In the present implementation, after the voltage supplied from the battery 1 has been raised by the step-up circuit 21, the raised voltage is transmitted to the wireless charging induction module of the external device W through the wireless charging induction module 3", so as to realize the wireless induction charging, and to wirelessly charge the external device. Compared to the wired connections and charging in the first and second implementations, the wireless charging of the present implementation is more convenience.

In summary, the tablet computer provided by the present disclosure includes the voltage regulator circuit 2, which includes the step-up circuit 21. The step-up circuit 21 is capable of raising the voltage supplied by the battery 1 of the tablet computer, so that the raised voltage can be used for charging the external device W connected with the tablet computer. In this manner, in a case where an external device with a relative small battery capacity, such as a mobile phone, runs out the battery, the external device can be charged through the carried on tablet computer that has a relative large battery capacity, so as to avoid a trouble in which a dedicated portable power supply has to be carried with a user.

It can be understood that the foregoing implementations are merely exemplary embodiments for the purpose of explaining the principle of the present disclosure, but the present disclosure is not limited thereto. Various modifications and improvements can be made by those of ordinary skills in the art without departing from the spirit and essence of the present disclosure. These modifications and improvements shall also fall into the protection scope of the present disclosure.

What is claimed is:

1. A tablet computer, which comprises a battery and a voltage regulator circuit, wherein the voltage regulator circuit comprises a step-up circuit for raising a voltage supplied by the battery in order to utilize the raised voltage to charge an external device connected with the tablet computer, wherein the voltage regulator circuit further comprises a step-down circuit for lowering a voltage to be input into the battery in order to make the voltage input into the battery be in a range of charging voltage for the battery;

wherein the step-down circuit is a DC-DC step-down circuit;

wherein the DC-DC step-down circuit comprises: a power supply input for inputting a power supply voltage; a power supply output for outputting a load voltage; a step-down control module for converting the power supply voltage input through the power supply input into the load voltage and for outputting the load voltage through the power supply output, an input of the step-down control module being connected with the power supply input and an output thereof being connected with the power supply output, and the step-down control module including a step-down control chip; and an external linear voltage regulator module for converting the load voltage into a chip operating voltage so as to supply power to the step-down control chip, an input of the external linear voltage regulator module being connected with the power supply output and an output thereof being connected with a bias power supply end of the step-down control module: and wherein the external linear voltage regulator module comprises a triode, a voltage-regulator diode, a first resistor, and a second resistor, the triode being of a NPN triode; wherein, one end of the first resistor is connected with the power supply output, and the other end of the first resistor is connected with a collector of the triode and one end of the second resistor; the other end of the second resistor is connected with a base of the triode and a cathode of the voltage-regulator diode; an anode of the voltage-regulator diode is grounded; an emitter of the triode is connected with a bias power supply pin of the step-down control chip in the step-down control module; the external linear voltage regulator module further comprises a first capacitor, one end of the first capacitor being connected with a common end of the first and second resistors, and the other end of the first capacitor is connected with the cathode of the voltage-regulator diode.

2. The tablet computer according to claim 1, wherein the tablet computer has a first charging port, one end of the first charging port being connected with the step-up circuit and the other end thereof being connected with the external device to be charged.

3. The tablet computer according to claim 2, wherein the first charging port is an USB port or a DC port.

4. The tablet computer according to claim 1, wherein the tablet computer has a wireless charging induction module for delivering energy to a to-be-charged external device having a wireless charging induction module by induction, so as to charge the external device.

5. The tablet computer according to claim 1, wherein the step-up circuit is a Boost circuit.

6. The tablet computer according to claim 5, wherein the Boost circuit comprises an inductor, a diode and a triode, the inductor and the diode being connected in series between a positive electrode of the battery and a positive electrode of an output of the Boost circuit, and the triode being used as a switch, an input thereof being connected between the inductor and an input of the diode and an output thereof being connected between a negative electrode of the battery and a negative electrode of the output of the Boost circuit.

7. The tablet computer according to claim 1, wherein the tablet computer has a second charging port, one end of the second charging port being connected with the step-down circuit and the other end thereof being used for connecting with a charger.

8. The tablet computer according to claim 7, wherein the second charging port is an USB port or a DC port.

9. The tablet computer according to claim 1, wherein the DC-DC step-down circuit further comprises: an input filter module which is connected between the power supply input and the input of the step-down control module and is used for filtering the power supply voltage that is input from the power supply input; an output feedback module, an input thereof being connected with the output of the step-down control module and an output thereof being connected with a feedback end of the step-down control module, wherein the output feedback module is used for sampling the load voltage output from the step-down control module and feeding back the same to the step-down control module; and a output filter module which is connected between the output of the step-down control module and the power supply output and is used for filtering the load voltage that is output from the step-down control module.

10. The tablet computer according to claim 1, wherein the tablet computer has a dual purpose port which is connected with the step-down circuit and the step-up circuit, the dual purpose port being used for connecting with an external device to be charged or being used for connecting with a charger.

11. The tablet computer according to claim 1, wherein the voltage regulator circuit further comprises a protection circuit.

12. The tablet computer according to claim 2, wherein the voltage regulator circuit further comprises a protection circuit.

13. The tablet computer according to claim 3, wherein the voltage regulator circuit further comprises a protection circuit.

14. The tablet computer according to claim 4, wherein the voltage regulator circuit further comprises a protection circuit.

15. The tablet computer according to claim 1, wherein the voltage regulator circuit is coupled with an operation system of the tablet computer, so as to monitor the capacity and the status of charging and discharging of the battery.

16. The tablet computer according to claim 9, wherein the output feedback module comprises a third resistor and a fourth resistor; one end of the third resistor is connected with a power switching output pin of the step-down control chip in the step-down control module, and the other end of the third resistor is connected with a feedback input pin of the step-down control chip and is grounded via the fourth resistor; the output feedback module further comprises a fifth resistor, wherein the fourth resistor is grounded via the fifth resistor and the fifth resistor is connected in series with the third resistor and the fourth resistor; the output feedback module further comprises a sixth resistor, one end of the sixth resistor being connected with a common end of the third and fourth resistors and the other end of the sixth resistor being connected with the feedback input pin of the step-down control chip.

17. The tablet computer according to claim 9, wherein the input filter module comprises a second capacitor and a third capacitor, wherein, one end of the second capacitor is connected with the power supply input and also connected with a power supply input pin of the step-down control chip in the step-down control module, and the other end of the second capacitor is grounded; the third capacitor is connected with the second capacitor in parallel.

18. The tablet computer according to claim 9, wherein the output filter module comprises a fourth capacitor, a fifth capacitor and a sixth capacitor; wherein, one end of the fourth capacitor is connected with a power switching output pin of the step-down control chip in the step-down control module and also connected with the power supply output, and the other end of the fourth capacitor is grounded; the fifth and sixth capacitors are connected with the fourth capacitor in parallel.

* * * * *